US012168242B2

(12) United States Patent
Schulze

(10) Patent No.: US 12,168,242 B2
(45) Date of Patent: Dec. 17, 2024

(54) SURFACE-TREATMENT FACILITY AND METHOD FOR SURFACE-TREATING VEHICLE BODIES

(71) Applicant: EISENMANN GMBH, Böblingen (DE)

(72) Inventor: Herbert Schulze, Aidlingen (DE)

(73) Assignee: EISENMANN GMBH, Böblingen (DE)

( * ) Notice: Subject to any disclaimer, the term of this patent is extended or adjusted under 35 U.S.C. 154(b) by 744 days.

(21) Appl. No.: 17/278,205

(22) PCT Filed: Sep. 11, 2019

(86) PCT No.: PCT/EP2019/074237
§ 371 (c)(1),
(2) Date: Mar. 19, 2021

(87) PCT Pub. No.: WO2020/058063
PCT Pub. Date: Mar. 26, 2020

(65) Prior Publication Data
US 2021/0346905 A1   Nov. 11, 2021

(30) Foreign Application Priority Data

Sep. 21, 2018   (DE) .......................... 102018123270.5

(51) Int. Cl.
*B05B 12/18*   (2018.01)
*B01D 3/34*   (2006.01)
(Continued)

(52) U.S. Cl.
CPC .............. *B05B 16/95* (2018.02); *B01D 3/346* (2013.01); *B05B 12/18* (2018.02); *B05B 12/32* (2018.02); *B05B 13/0452* (2013.01); *B05B 14/40* (2018.02)

(58) Field of Classification Search
None
See application file for complete search history.

(56) References Cited

U.S. PATENT DOCUMENTS 8,590,482 B2 * 11/2013 Nishihara ................. B05C 3/10
118/423
9,688,478 B2   6/2017 Robbin
(Continued)

FOREIGN PATENT DOCUMENTS

DE   3906857 A1   5/1990
DE   19725048 A1   12/1998
(Continued)

OTHER PUBLICATIONS

International Search Report cited in corresponding PCT application No. PCT/EP2019/074237; Dec. 13, 2019; 6pp.
(Continued)

*Primary Examiner* — Binu Thomas
(74) *Attorney, Agent, or Firm* — Lempia Summerfield Katz LLC

(57) ABSTRACT

The invention relates to a surface-treatment facility (10) for surface-treating vehicle bodies (12), said facility comprising at least two floor-bound transport carriages (20), each of which comprises a fastening device (18), to which vehicle bodies (12) can be fastened. Each transport carriage (20) can be shifted by means of its own drive that can be carried therewith. The surface-treatment facility (10) also comprises a substantially gas-tight treatment chamber (14) that is delimited by a housing (15). The vehicle bodies (12) can be moved, at least temporarily, in the treatment chamber (12) by means of a relevant transport carriage (20). The surface-treatment facility (10) further comprises a travel region (22), arranged outside the housing (15), in which the transport carriages (20) can be moved, at least temporarily. Furthermore, the surface-treatment facility (10) comprises a gap (Continued)

(30) which is formed in the housing (15) between the travel region (22) and the treatment chamber (14) and through which the fastening device (18) of the relevant transport carriage (20) protrudes if the transport carriage (20) is in the travel region (22) A first atmosphere can be generated in the travel region (22) and a second atmosphere, which is different from the first atmosphere, can be generated in the treatment chamber (14).

12 Claims, 8 Drawing Sheets

(51) Int. Cl.
  *B05B 12/32* (2018.01)
  *B05B 13/04* (2006.01)
  *B05B 16/00* (2018.01)
  *B05B 14/40* (2018.01)

(56) References Cited

U.S. PATENT DOCUMENTS

| | | | |
|---|---|---|---|
| 10,676,283 B2 * | 6/2020 | Gümbel | B65G 17/12 |
| 11,085,695 B2 * | 8/2021 | von Bargen | B05B 16/95 |
| 11,167,305 B2 | 11/2021 | Schwab et al. | |
| 11,364,962 B2 * | 6/2022 | Von Krauland | B65G 17/005 |
| 11,486,641 B2 * | 11/2022 | Gümbel | F26B 25/12 |
| 2013/0199893 A1 | 8/2013 | Robbin | |
| 2018/0120028 A1 * | 5/2018 | Robbin | B05B 16/20 |
| 2019/0217320 A1 * | 7/2019 | Schulze | B05B 13/0285 |
| 2020/0011599 A1 * | 1/2020 | Burkart | B05B 16/95 |
| 2020/0114384 A1 | 4/2020 | Schwab et al. | |

FOREIGN PATENT DOCUMENTS

| | | | | |
|---|---|---|---|---|
| DE | 102010045010 A1 | | 3/2012 | |
| DE | 102016004484 A1 | | 10/2017 | |
| DE | 202017106843 U1 | | 11/2017 | |
| DE | 102017118561 A1 | | 2/2019 | |
| EP | 1319444 A2 * | | 12/2000 | B05C 3/10 |
| JP | S5969174 A | | 4/1984 | |
| JP | S6034761 A | | 2/1985 | |
| JP | H01115469 A | | 5/1989 | |
| JP | H04118168 U * | | 10/1992 | |
| JP | 2005280582 A * | | 10/2005 | |
| JP | 2009154145 A | | 7/2009 | |
| WO | WO-2016180516 A1 * | | 11/2016 | B05B 13/0221 |
| WO | 2017178317 A1 | | 10/2017 | |

OTHER PUBLICATIONS

Translation of the Office Action cited in Japanese patent application No. 2021-540905; Jul. 26, 2023; 4 pp.

* cited by examiner

SURFACE-TREATMENT FACILITY AND METHOD FOR SURFACE-TREATING VEHICLE BODIES

RELATED APPLICATION DATA

This application is a U.S. national stage of and claims priority benefit to prior filed international application no. PCT/EP2019/074237, filed Sep. 11, 2019, and which claims priority to German national application no. 10 2018 123 270.5, filed Sep. 21, 2018. The entire contents of these prior filed applications are hereby incorporated by reference herein.

BACKGROUND TO THE INVENTION

1. Field of the Invention

The invention relates to the surface treatment of vehicle bodies in which floor-bound transport trucks having dedicated on-board drives convey the vehicle bodies through a treatment chamber.

2. Description of the Prior Art

In the production of vehicle bodies, the latter pass through many different operating steps in which operations of various types are carried out on the vehicle bodies. Said operations include measures in which the vehicle body is subjected to active processing. This includes, for example, the joining of individual parts in the body-in-white, the application of paints or other material, or the drying of previously applied coatings. There are moreover measures in which the vehicle body is not subjected to active processing, such as when evaporating the vehicle body. After the build of the body-in-white, the vehicle bodies are actively or passively treated in various regions in various ways in a surface treatment facility.

In the surface treatment facilities known to date, track-bound conveying systems convey the vehicle bodies through the various operating stations in a largely invariable sequence. The rigid sequence of operating steps however limits the flexibility in terms of production.

If at all, any variation of the treatment sequence in such track-bound conveying systems is only possible if transfer devices are present. Corresponding secondary routes have to be made available herein, on account of which the complexity in terms of construction and the associated costs become very high.

SUMMARY OF THE INVENTION

It is an object of the invention to specify a surface treatment facility for the surface treatment of vehicle bodies which addresses these concepts.

This object is achieved by a surface treatment facility for the surface treatment of vehicle bodies, having:

a) at least two floor-bound transport trucks which have in each case one fastening installation to which vehicle bodies are able to be fastened, wherein each transport truck is able to be independently displaced by means of a dedicated drive that is able to be carried onboard said transport truck;

b) a treatment chamber which is delimited in a substantially gas-tight manner by a housing and in which the surfaces of the vehicle bodies are treatable, and in which at least part of the fastening installations and the vehicle bodies fastened thereto by means of the respective transport truck are able to be at least temporarily moved in the treatment chamber;

c) a travel region which is disposed outside the housing and in which the transport trucks are able to at least temporarily travel, wherein the respective transport truck is situated in the travel region when at least part of the respective fastening installation and the vehicle body fastened thereto is situated in the treatment chamber; and d) a gap which in the housing is configured between the travel region and the treatment chamber and through which the fastening installation of the respective transport truck protrudes when the transport truck is situated in the travel region;

wherein a first atmosphere is able to be generated in the travel region, and a second atmosphere which differs from the first atmosphere is able to be generated in the treatment chamber.

Since the transport trucks have their dedicated onboard drives, the vehicle bodies which are fastened to the respective transport truck and are to be treated can be conveyed in a flexible and mutually independent manner. Individual variations at short notice in the production sequence of an individual vehicle body can thus also be implemented.

On account of the different atmospheres being generated in the treatment chamber and in the travel region, it can furthermore be avoided that the transport trucks are exposed to the second atmosphere that prevails in the treatment chamber. Damage to sensitive components of the transport truck can be avoided and the risk of explosions can be minimized on account thereof. Furthermore, the transport truck remains free of treatment agents which are introduced into the treatment chamber or created in the latter. These treatment agents can be, for example, an overspray which is created during painting while using rotary atomizers. Because such treatment agents cannot settle on the wheels of the transport truck, the adhesion between the wheels of the transport truck and the running surface of the floor is not compromised. For improved fire safety, the transport trucks can also carry onboard fire extinguishing installations.

The maintenance of the transport trucks in the travel region is moreover facilitated on account of the different atmospheres being generated. In a coating facility, for example, rapid venting of the coating facility has to be carried out prior to anyone being able to enter the treatment chamber. On account thereof, substances that are harmful to humans are removed from the atmosphere of the treatment chamber. By virtue of the first atmosphere in the travel region that is generated independently from that in the treatment chamber, no harmful substances are contained in said first atmosphere such that no rapid ventilation of the travel region is required prior to anyone entering the latter.

The transport trucks can travel continuously or in cycles in the travel region. In a cycled travel mode, the transport trucks can travel simultaneously or in a temporally offset manner.

The transport trucks in the travel region herein are preferably guided in an optical manner by way of structures in the travel region, for example markings on the floor of the travel region. Alternatively, electronic markers and/or wireless systems with the aid of which the transport trucks are guided in the travel region may also be provided. Furthermore, a barcode system with the aid of which the position and speed of the transport trucks are controlled may also be provided in the travel region. It is also conceivable for mechanical guides for positioning the transport trucks to be disposed in the travel region. Alternatively or additionally to signal emitters or camera systems of the transport trucks, stationary camera systems or other sensors which detect the location and/or the speed of the transport trucks and relay said location and/or speed to a central controller may be provided.

The first atmosphere and/or the second atmosphere can in particular be actively generated. In the case of active generation, the surface treatment facility comprises preferably energy-powered means and varies the first and/or the second atmosphere in relation to the environment and/or in relation to the respective other atmosphere. The term "generating" can also be understood to include an already existing atmosphere being passively maintained. In this case, an already existing atmosphere, for example an atmosphere existing in a production building, is maintained in the respective region (usually the travel region). This can under circumstances require measures such as insulating walls, ventilation ducts or passages which enable the external atmosphere to spread into the respective region. In most cases, the second atmosphere in the treatment chamber is actively generated, while the first atmosphere prevalent in the travel region is passively generated. However, cases in which both the first and the second atmosphere are actively generated are also conceivable.

The surface treatment facility at the entry and exit of the treatment chamber can comprise doors or locks through which the vehicle bodies to be treated are moved.

A substantially gas-tight delimitation by way of the housing is to be understood in that the gas contained in the treatment chamber, if at all, can flow out of the treatment chamber in negligibly minor quantities when the doors or locks are closed (for instance through the gap).

The first atmosphere preferably differs from the second atmosphere on account of at least one parameter, wherein the parameter is selected from the group comprising: temperature, pressure, air humidity, chemical composition, flow rate, flow direction, and particle load.

As has already been mentioned above, it is advantageous in a coating facility to keep the particle load low in the region of the transport truck. A precipitate of overspray on the floor of the travel region and/or on the transport truck per se is in particular avoided on account thereof.

When the treatment chamber serves for drying, the temperature in the region of the transport truck should be kept lower than in the treatment chamber so as to prevent any damage to electronic or other sensitive components of the transport truck. No complex cooling or heat-protection measures are required on the transport truck on account thereof. Furthermore, the heating and cooling requirement can be individually adapted on account of the treatment chamber and the travel region being differently temperature-controlled, on account of which the energy consumption of the facility is reduced.

In one exemplary embodiment, an atmospheric separation installation which impedes or prevents any exchange of atmospheres, at least from the treatment chamber to the travel region, is provided.

Impeding or preventing exchange of atmospheres in the opposite direction, that is to say from the travel region to the treatment chamber, is additionally possible, but the objective of the separated atmospheres is to keep the second atmosphere of the treatment chamber, which is potentially damaging to the transport truck, away from the transport truck. Consequently, it is typically not necessary to prevent or impede any ingress of the atmosphere of the travel region into the treatment chamber.

The atmospheric separation installation can be active or passive.

A sealing device which is disposed in or on the gap can be provided as the passive atmospheric separation installation. Such a passive sealing device can in particular comprise blinds, flaps, sealing sleeves, sealing brushes, a sand tray seal, or a combination of these sealing devices.

It is particularly advantageous for such a passive sealing device to have elastic properties. The gap is thus completely closed by means of the sealing device when no part of the fastening installation of the transport truck is situated in the gap. The sealing device is deflected by parts of the fastening installation when a transport truck travels through the facility.

A fan by means of which an air flow which impedes or prevents any exchange of atmospheres, at least from the treatment chamber to the travel region, is able to be generated can be provided. The fan can be disposed on and fastened to the respective transport truck; a stationary fan or a fan assembled in the travel region is however also conceivable.

The air flow is preferably an air curtain which closes the gap in an at least almost air-tight manner. The term air curtain is to be understood to be a substantially laminar flow in the form of a compact area. The flow is generated by means of a slot nozzle or a plurality of nozzles which are disposed along a straight or curved line. Apart from air, other gas mixtures or a pure gas may also exit the nozzle or nozzles.

The air flow in an air curtain runs transversely to the direction along which air would flow between the treatment chamber and the travel region in the presence of a pressure gradient.

For example, the air curtain can be generated across the entire length of the gap by stationary fans. Should the gap be sealed by a sealing device, the air curtain can also be locally generated by a fan which is carried onboard the transport truck in order for the sealing effect to be increased in the region of the transport truck.

Alternatively, the air flow can be blown into the treatment chamber so as to prevent the air of the treatment chamber entering the travel region. In this case, the air flow runs counter to the direction along which air would flow between the treatment chamber and the travel region in the presence of a pressure gradient. On account thereof, the impulse of the blown air acts into the treatment chamber, on account of which the air in the treatment chamber is more intensely forced back. An ingress of air from the treatment chamber into the travel region can thus be prevented.

In one exemplary embodiment, the transport truck in the travel region is able to be at least temporarily moved by means of a drive system which is installed in the travel region and is independent of the drive that is able to be carried onboard said transport truck. On account of this additional drive system, driving the transport truck through the surface treatment facility is independent from the conditions in terms of friction between the wheels of the transport truck and the running floor. Driving the transport truck without slippage is thus possible under poor frictional conditions between the wheels of the transport truck and the running floor. This facilitates precise positioning of the vehicle body in the treatment chamber, for example relative to application apparatuses that are disposed therein. Camera systems which assist in positioning the vehicle body can be additionally disposed in the treatment chamber.

A simultaneous operation of both drives may also be advantageous. Variable speeds and spacings of transport trucks in relation to one another can thus be set while at the same time providing a high level of accuracy in terms of positioning. Furthermore, higher speeds are possible in environments in which there is little adhesion between the wheels of the transport truck and the running floor.

The additional drive system in at least part of the travel region is connected in a form-fitting manner to the transport truck. Particularly reliable and precise driving of the transport trucks independently of the conditions in terms of friction in the travel region results on account thereof. On account thereof it is furthermore also possible for comparatively steep gradients to be negotiated by the transport truck. Chain conveyors, gear-and-rack conveyors, or drag conveyors are preferable as drive systems of this type.

The drive that is able to be carried onboard can be supplied with external energy. It is generally more favorable for an energy accumulator which is able to be carried onboard the transport truck and which supplies the drive that is able to be carried onboard with energy to be provided. No lines for the supply of energy to the transport trucks and which may represent an obstacle and a risk in the operation of the facility are required on account thereof.

In one exemplary embodiment, an adjustment device which in the treatment space is specified for providing the fastening installation and the vehicle body fastened thereto at a variable height is provided. Particularly flexible handling of the vehicle bodies to be treated results on account thereof, the surfaces of the vehicle body being better accessible to the treating application installations in the treatment space on account thereof. An adjustment device of this type can also be utilized for stabilizing the vehicle bodies when being treated in the treatment chamber in that the vehicle bodies are lowered by being lowered onto rails or other guide elements, or by being lifted are pressed against rails or other guide elements.

Depending on the type of treatment it can be favorable for the adjustment device to be additionally able to tilt and rotate the vehicle bodies.

The adjustment device is preferably pneumatically operated; the adjustment device can however also be driven by means of one or a plurality of electric motors.

The mounting installation can be part of the adjustment device; other units which are of a separate construction may however also be considered.

If an adjustment installation is dispensed with, the application installations can have handling devices which are more variable and more flexible.

In one exemplary embodiment, a monitoring installation which is disposed on the transport truck and for checking the spacing of transport trucks from objects and/or people has a monitoring region is provided, wherein the size of the monitoring region and/or the position of the monitoring region relative to the transport truck are/is variable. Collisions between the transport trucks and other transport tracks, and parts of the surface treatment facility or people are avoided on account thereof. A monitoring region is understood to be the region in which the monitoring installation emits a warning signal should an object and/or a person be situated in this region. The monitoring installation sends a command to the control system of the transport truck, said command leading to the transport truck adapting its position.

Adapting the size and/or position of the monitoring region between the operation of the transport truck in the travel region and outside the travel region where the transport truck moves away from the treatment chamber is preferable. The monitoring region can thus be reduced in size when the transport truck is situated in the travel region, because the spacings between transport trucks and objects and/or other transport trucks are smaller there than outside the travel region. Since the risk of collision in the travel region is reduced by virtue of the mostly rectilinear profile of the travel region and the mostly uniform speed of the transport trucks, it may even be considered that the monitoring installation is completely switched off in the travel lane. The smaller monitoring region leads to the spacing between the transport trucks being able to be set so as to be smaller, on account of which an efficient operation of the surface treatment facility is achieved.

A manufacturing facility for producing vehicles, having a surface treatment facility according to the invention is furthermore a subject matter of the invention.

It is moreover an object of the invention to specify a method for the surface treatment of vehicle bodies, said method taking into account the concepts mentioned at the outset.

This object is achieved according to the invention by a method for the surface treatment of vehicle bodies, in which method:

a) at least two floor-bound transport trucks which have in each case one fastening installation to which vehicle bodies are able to be fastened, wherein each transport truck is independently displaced by means of a dedicated drive that is able to be carried onboard said transport truck;

b) at least part of the fastening installations and the vehicle bodies fastened to the fastening installations by means of the transport truck are at least temporarily moved in a treatment chamber which by a housing is delimited in a substantially air-tight manner, wherein the vehicle bodies are treated in the treatment chamber;

c) the transport trucks are at least temporarily moved to a travel region which is disposed outside the housing, wherein the respective transport truck is situated in the travel region when at least part of the respective fastening installation and the vehicle body fastened thereto are situated in the treatment chamber; and d) the fastening installation of the respective transport truck protrudes through a gap which in the housing is configured so as to be between the travel region and the treatment chamber when the transport truck is situated in the travel region;

wherein a first atmosphere is generated in the travel region, and a second atmosphere which differs from the first atmosphere is generated in the treatment chamber.

In one exemplary embodiment, an exchange of atmospheres at least from the treatment chamber to the travel region is impeded or prevented by an atmospheric separation installation.

In one exemplary embodiment, the atmospheric separation installation is a fan by means of which an air flow which impedes or prevents an exchange of atmospheres at least from the treatment chamber to the travel region is generated.

In another exemplary embodiment, the transport truck is at least temporarily moved in the travel region by means of a drive system which is installed in the travel region and is independent of the drive that is able to be carried onboard said transport truck.

In one further exemplary embodiment, a monitoring installation which is disposed on the transport truck by way of a monitoring region checks the spacing of the transport trucks from objects and/or people, wherein the size of the monitoring region and/or the position of the monitoring region relative to the transport truck are/is variable, and wherein the monitoring region is decreased when the transport truck enters the travel region and/or is increased when said transport truck exits the travel region.

In one exemplary embodiment, the spacing of successive transport trucks in the travel region is varied. Utilizing the space in an optimal manner and adapting to bodies of different sizes is enabled and any collision between the transport trucks and/or bodies and objects and/or people is prevented on account thereof.

Alternatively, the mutual spacing of the transport trucks as a function of the body size of the vehicle body transported can be set in advance and maintained during the operation.

In one exemplary embodiment, the direction of movement of the transport truck is varied. A particularly flexible design of the manufacturing line results on account thereof because the processing stations do not have to be mandatorily disposed so as to be mutually aligned behind one another in one line. Instead, the processing stations can be freely disposed on the available space and be approached by the transport trucks in that the latter change their direction of movement.

In one further aspect of the invention, the travel region comprises a maintenance region which for safe servicing of a defective transport truck is completely closed off by a barrier. The maintenance region herein is disposed in such a manner that an operation of the functioning transport trucks is possible while the latter are being serviced. The barrier preferably comprises a door by means of which maintenance personnel or maintenance installations, for example a robot, have access to the defective transport truck.

The travel region furthermore comprises a thrust or drag installation by way of which a defective transport truck can be removed from the travel region. Alternatively, a functioning transport truck can be specified for removing a defective transport truck from the travel region. The functioning transport truck can push or drag the defective transport truck out of the travel region.

BRIEF DESCRIPTION OF THE DRAWINGS

Exemplary embodiments of the invention will be explained in more detail hereunder by means of the drawings in which.

DESCRIPTION OF PREFERRED EXEMPLARY EMBODIMENTS

1. First Exemplary Embodiment

Figure 1:
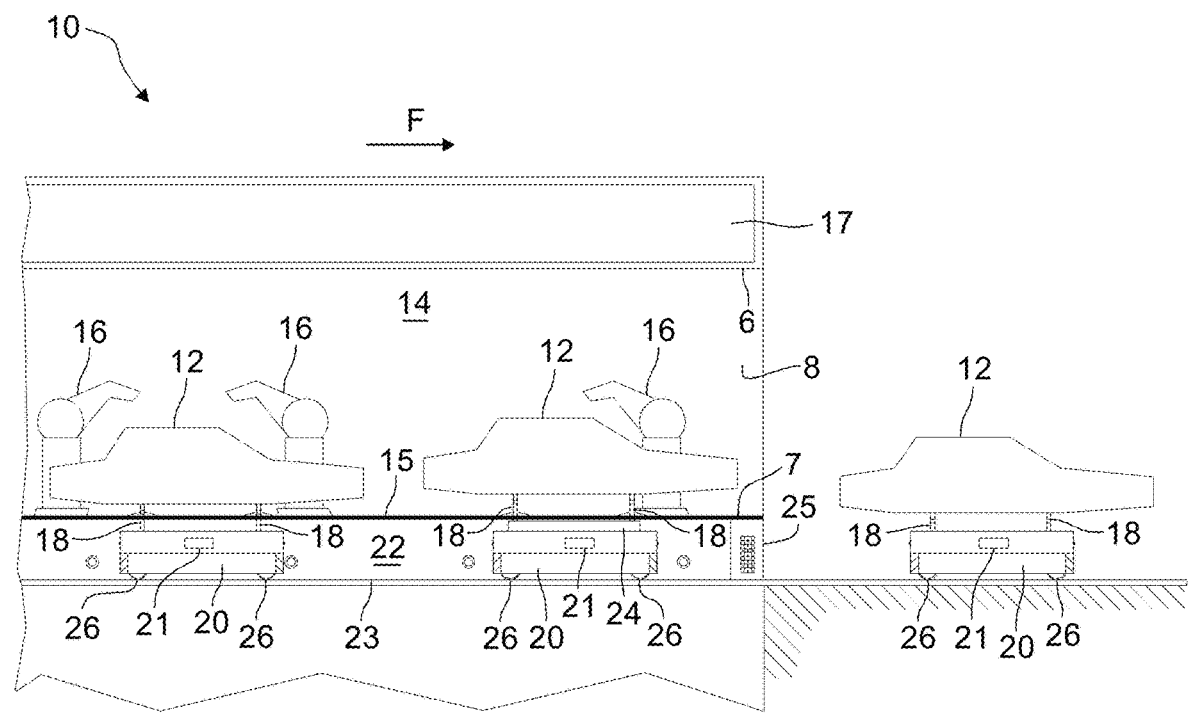
FIG. 1 shows a surface treatment facility according to the invention according to a first exemplary embodiment in a section along the conveying direction F.

FIG. 1 shows a surface treatment facility 10 according to the invention for the surface treatment of vehicle bodies 12. The surface treatment facility 10 can be a painting facility, for example. The vehicle bodies 12 are disposed in a treatment chamber 14 which is delimited in a substantially gas-tight manner by a housing 15. The housing 15 comprises a ceiling 6, a floor 7, and lateral walls 8. Application installations 16 for treating the surfaces of the vehicle bodies 12 are disposed in the treatment chamber 14. The application installations can be, for example, robots, the movable arm of the latter supporting a rotary atomizer. A plenum 17 is disposed above the treatment chamber 14.

The vehicle bodies 12 are releasably fastened to fastening installations 18 which are connected to transport trucks 20 and supported by the latter. The transport trucks 20 are disposed in a travel region 22 having a running floor 23. The travel region 22 is disposed below the treatment chamber 14 and separated from the treatment chamber 14 by the floor 7 of the housing 15. The floor 7 in the exemplary embodiment illustrated also supports the application installations 16. Alternatively thereto, additional support structures such as longitudinal beams or the like, which support the application installations 16, can extend in the treatment chamber. Moreover, the application installations 16 can also be fastened to another part of the housing 15, for example suspended on one of the lateral walls 8 or on the ceiling 6 of the housing 15.

The transport trucks 20 have wheels 26 by way of which the transport trucks 20 are moved in the conveying direction F on the running floor 23 of the travel region 22. The wheels are preferably omnidirectional running wheels. On account thereof, the transport trucks 20 are able to be maneuvered in a particularly flexible manner in the tightest space. Furthermore, the transport trucks 20 have dedicated onboard drives 21.

The transport trucks 20 comprise deployable adjustment devices 24 by way of which the position of the vehicle bodies 12 in the treatment chamber 14 can be varied. In FIG. 1, the vehicle body 20 which in the conveying direction F is at the front in the treatment chamber 14, by means of the deployed adjustment device 24 is elevated in relation to the further vehicle bodies 20. The higher position of the vehicle body 20 often enables improved processing access of the application installation 16 to the vehicle body 20.

The adjustment devices 24 can also be embodied in such a manner that said adjustment devices 24 pivot the fastening installations 18 about one axis or a plurality of axes. Alternatively thereto, the adjustment devices 24 to this end can be integrated in the fastening installations 18, as is the case in a scissors lift, for example, a vehicle body 12 being able to be directly fastened to the table of said scissors lift.

A lock 25 is disposed at the exit of the travel region 22. The lock 25 can in particular be a mechanical element, for example a flap. However, an air curtain is also conceivable as the lock 25.

A lock of an identical type is preferably also situated at the entry into the travel region 22 (not illustrated). Locks can also be disposed at the entry and exit of the treatment chamber 14.

The transport trucks 20 by means of dedicated drives which are able to be carried on board travel in the conveying direction F through the travel region 22. The vehicle bodies 12 are transported through the treatment chamber 14 by the transport trucks 20 and treated by the application installations 16. The adjustment devices 24 herein can lift or lower the vehicle body 12 in the treatment chamber when required.

The vehicle bodies 12 are subsequently transported out of the treatment chamber 14 by the transport trucks 20 and can be supplied to a further treatment station.

Figure 2:
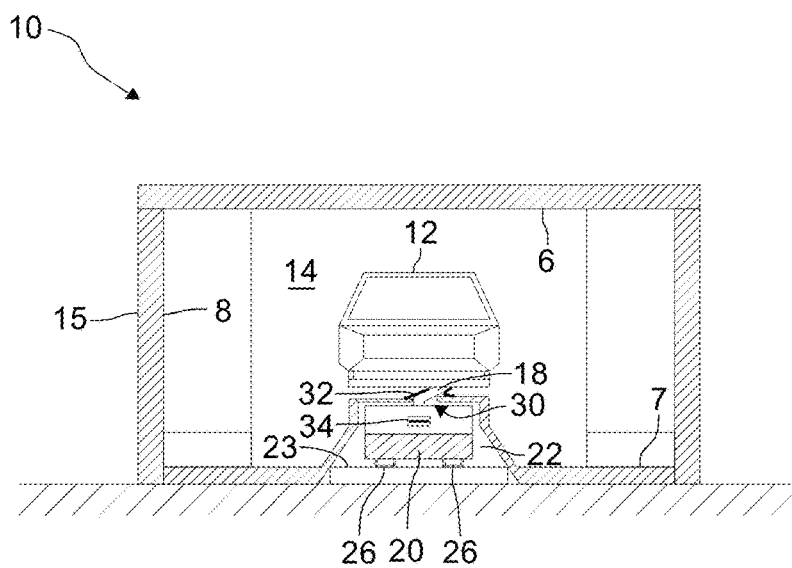
FIG. 2 shows the surface treatment facility shown in FIG. 1 in a section transverse to the conveying direction F.

FIG. 2 shows a section transverse to the conveying direction F of the surface treatment facility 10 shown in FIG. 1. As opposed to FIG. 1, a gap 30 which is configured on the floor 7 of the housing 15 of the treatment chamber 14 can additionally be seen in FIG. 2. The gap 30 is closed by means of a sealing device 32 which prevents or impedes an exchange of atmospheres between the treatment chamber 14 and the travel region 22. On account thereof, none of the atmosphere of the treatment chamber 14, or only minor quantities thereof, enter the travel region 22. Practically no substances which are created in the treatment of the vehicle bodies 12 or are required for the treatment (paint particles, for example) thus make their way into the travel region 22. The sealing device 32 thus avoids damage to the transport trucks 20 and contamination of the running floor 23.

In the exemplary embodiment shown in FIG. 2, a monitoring installation 34 is furthermore disposed on the transport truck 20, said monitoring installation 34 checking the spacing of the transport truck 20 from other objects and/or people. The monitoring installation 34 comprises one or a plurality of distance monitoring sensors which detect transport trucks 34 and/or other objects in a monitoring region U. The monitoring installation 34 sends a command to the controller of the transport truck 20 when a transport truck 34 and/or any other object is situated in the monitoring region U. The controller of the transport truck 20 processes the commands and, with the aid of the drive 21, so as to increase the spacing of the transport truck 20 from the detected transport truck 34 and/or any other object corrects the position and/or the speed of the transport truck 20. When no transport truck 34 and/or any other object is situated in the monitoring region U of the monitoring installation 34, the latter does not send any commands to the controller of the transport truck 20.

Should a plurality of distance monitoring sensors 34 be provided, the latter can be disposed so as to be distributed on the surface of the transport truck 20, for example on the front side and the rear side and on the sides of the transport truck 20 so as to enable monitoring in a large area around the respective transport truck 20.

2. Second Exemplary Embodiment

Figure 3:
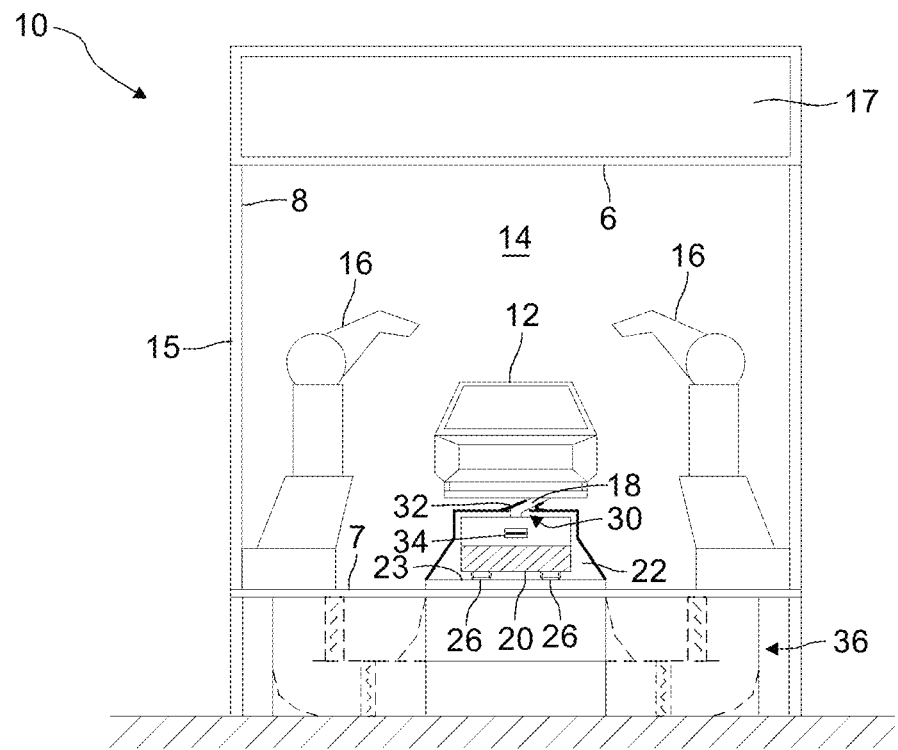
FIG. 3 shows a variant of the surface treatment facility from FIG. 2, wherein the surface treatment facility additionally has a separation chamber.

FIG. 3 shows an exemplary embodiment of the surface treatment facility 10 as a dry facility. The surface treatment facility 10 of FIG. 3 substantially has the elements of the surface treatment facility 10 of FIG. 1. The surface treatment facility 10 of FIG. 3 moreover has a separation chamber 36 for separating substances, for example overspray, which are released in the treatment chamber 14. The separation chamber 36 is disposed below the running floor 23 and thus below the travel region 22 and the treatment chamber 14. It is however also conceivable for the separation chamber 36 to be disposed beside the travel region 22 or beside the treatment chamber 14.

3. Third Exemplary Embodiment

Figure 4:
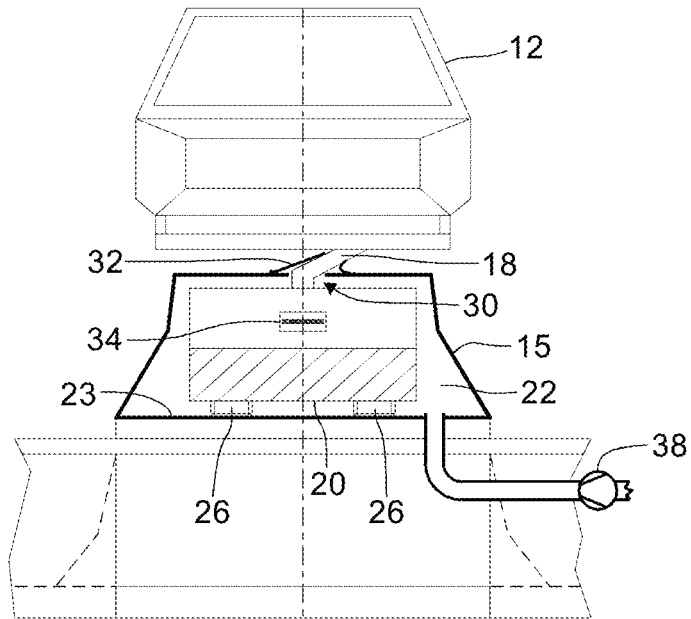
FIG. 4 shows a fragment of the surface treatment facility from FIG. 3, wherein the surface treatment facility has a fan as an atmospheric separation installation.

FIG. 4 shows a fragment of the surface treatment facility 10 of FIG. 3. The surface treatment facility 10 additionally has a fan 38 which supplies air to the travel region 22 of the transport truck 20.

A positive pressure is created in the travel region 22 on account of the air being supplied into the travel region, this in turn preventing or impeding any ingress of the atmosphere of the treatment chamber 14 into the travel region 22. Alternatively, the positive pressure can be at least locally generated in the proximity of the transport truck 20 by means of a compressed-gas reservoir that is carried on board the transport truck 20. In order for explosions to be avoided, the gas contained in the compressed-gas reservoir is preferably nitrogen or any other explosion-preventing gas.

4. Fourth Exemplary Embodiment

Figure 5:
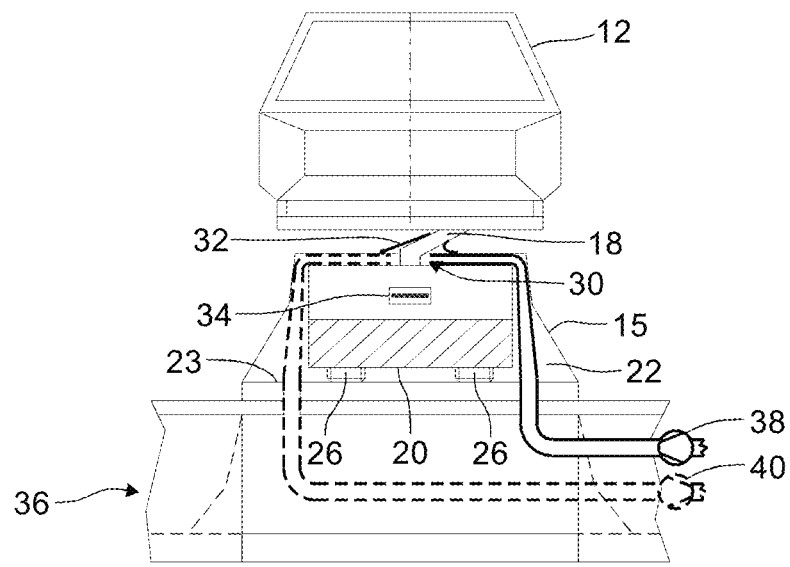
FIG. 5 shows the fragment of the surface treatment facility from FIG. 4, wherein the fan generates an air curtain.

FIG. 5 substantially shows the fragment of the surface treatment facility 10 of FIG. 4. As opposed to FIG. 4, the routing of the air of the air flow generated by the fan 38 in FIG. 5 is however directed in such a manner that an air curtain is generated at the gap 30, on account of which the gap 30 is closed in an at least almost air-tight manner. A suctioning device 40 is likewise disposed in the surface treatment facility 10, said suctioning device 40 at the gap 30 suctioning the air flow generated by the fan 38.

5. Fifth Exemplary Embodiment

Figure 6:
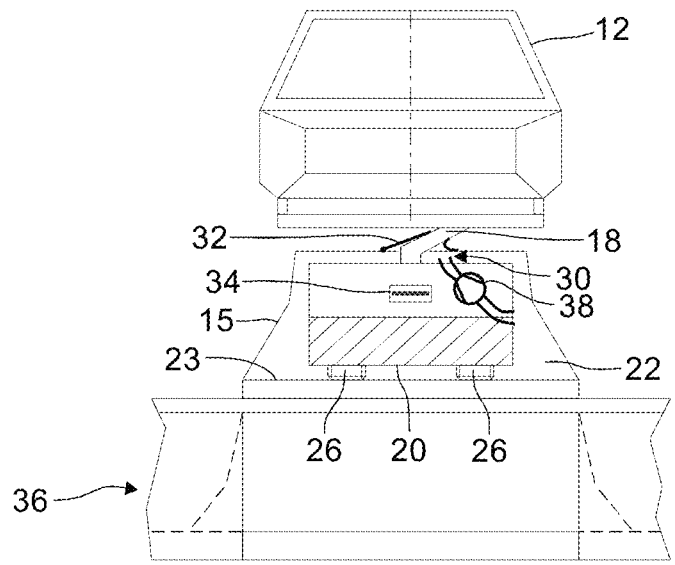
FIG. 6 shows the fragment of the surface treatment facility from FIG. 4, wherein the fan suctions air from the travel region.

FIG. 6 substantially shows the surface treatment facility 10 of FIG. 4, but as opposed to FIG. 4, the fan 38 of FIG. 6 suctions air from the travel region 22. The air is supplied to the gap 30 so as to impede or prevent any exchange of atmospheres from the treatment chamber 14 to the travel region 22. This has the advantage that a positive pressure is not generated in the entire travel region 22. The suctioning of the air in the travel region 22 creates a negative pressure at the suction location of the fan. The air flows from the positive pressure location to the negative pressure location in order for the pressure differential to be equalized. On account thereof, a circulation of the suctioned and blown air in the travel region 22 is generated. Consequently, the blown air does not flow through the gap 30 into the treatment chamber 14, as opposed to the exemplary embodiment shown in FIG. 4.

This in comparison to FIG. 4 has the advantage that an exchange of atmospheres from the travel region to the treatment chamber is also prevented. The constantly circulating air in the travel region 22 moreover has the effect of cooling the transport truck 20 and the components thereof.

6. Sixth Exemplary Embodiment

Figure 7:
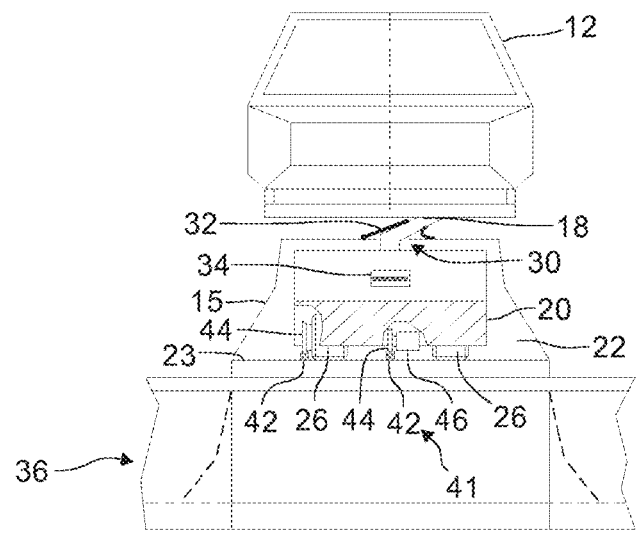
FIG. 7 shows a fragment of the surface treatment facility from FIG. 3, wherein the transport truck has a gear wheel for driving the transport truck in a form-fitting manner.
Figure 8:
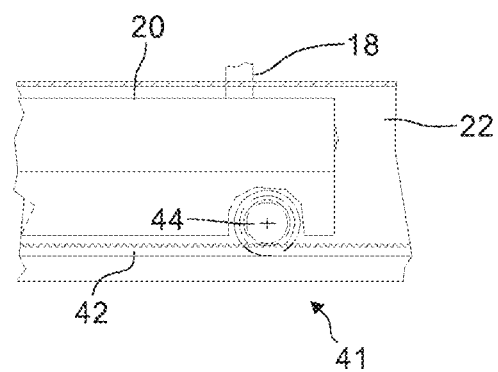
FIG. 8 shows a lateral view of a region of the surface treatment facility from FIG. 7.

FIGS. 7 and 8 show an exemplary embodiment of the form-fitting drive system 41 according to the invention. The form-fitting drive system 41 comprises two racks 42 which are assembled so as to be locationally fixed in the travel region 22. The transport truck 20 additionally comprises gear wheels 44 and a motor 46. The motor 46 drives the gear wheels 44, on account of which the gear wheels 44 engage in a formfitting manner in the racks 42 and roll along the racks 42. On account thereof, the transport truck 20 is driven in a form-fitting manner along the conveying direction F and herein rolls on the wheels 26 along the running floor 23.

It is however also conversely conceivable that a multiplicity of gear wheels 44 are assembled so as to be locationally fixed along the travel region. The gear wheels 44 are driven by means of an electric motor, for example. The rack 42 in this case is assembled on the transport truck 20. The gear wheels 44 engage in a likewise form-fitting manner in the rack 42. The transport truck 20 is displaced along the travel region 22 on account of the gear wheels 44 being driven and connected in a form-fitting manner to the rack 42 that is fastened to the transport truck 20.

7. Seventh Exemplary Embodiment

Figure 9:
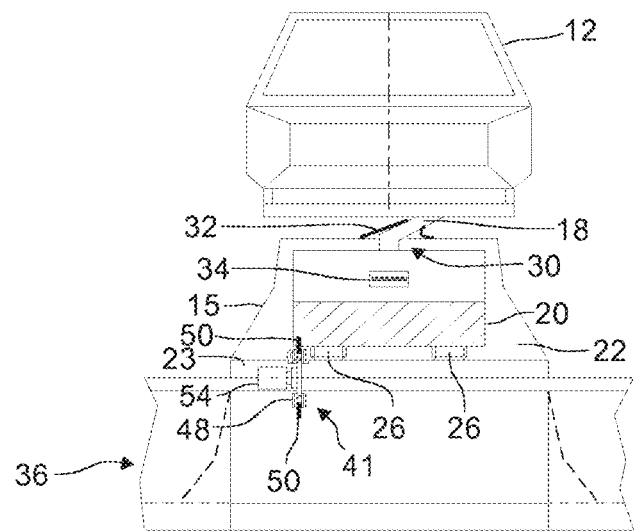
FIG. 9 shows a fragment of the surface treatment facility from FIG. 3, wherein the surface treatment facility has a chain for driving the transport truck in a form-fitting manner.
Figure 10:
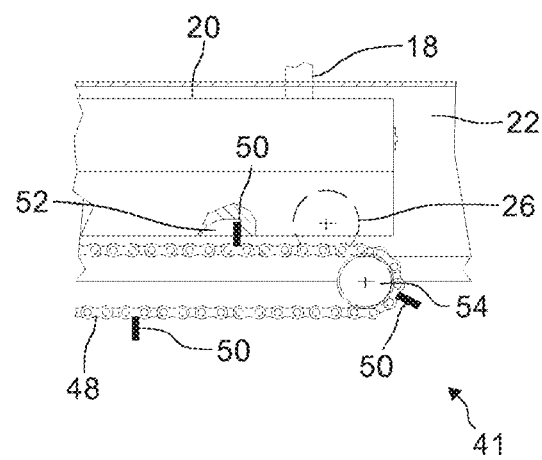
FIG. 10 shows a lateral view of a region of the surface treatment facility from FIG. 9.

FIGS. 9 and 10 show a second exemplary embodiment of the form-fitting drive system 41 according to the invention. The form-fitting drive comprises a chain 48 having entrainment elements 50 fastened thereto and a drive unit 54. The transport truck 20 has engagement elements 52 in which the entrainment elements 50 engage. The drive unit 54 drives the chain 48 and on account thereof moves the transport truck through the travel region 22.

Figure 11:
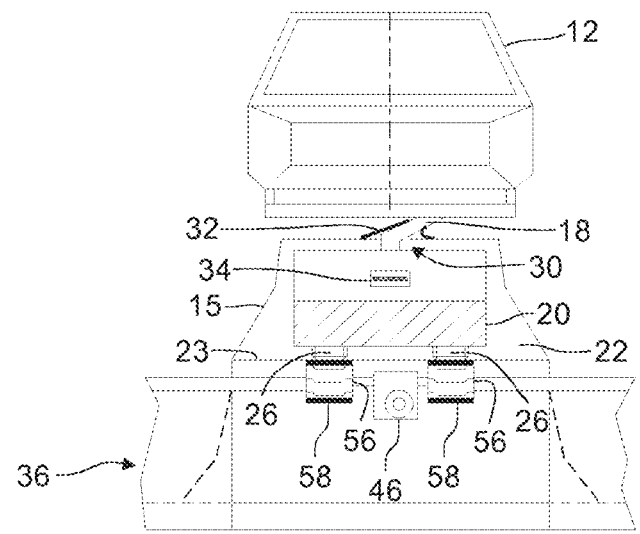
FIG. 11 shows a fragment of the surface treatment facility from FIG. 3, wherein the surface treatment facility has a conveyor belt for driving the transport truck.
Figure 12:
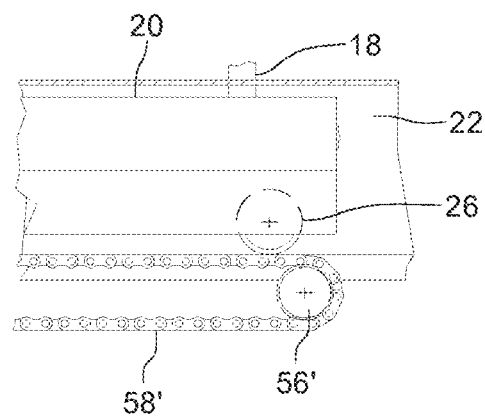
FIG. 12 shows a lateral view of a region of the surface treatment facility from FIG. 11.

FIGS. 11 and 12 show an alternative exemplary embodiment of an external drive in which the transport truck 20 is supported and conveyed by a transport means that is moved in a translatory manner. FIG. 11 shows two such transport means which are configured as transport belts 58. In order for the transport belts 58 to be moved, the drive comprises rollers 56 which are connected in a form-fitting manner to the transport belts 58. In order to connect in a form-fitting manner, gripping elements which are configured on the rollers 56 engage in depressions or openings of the transport belts 58. The rollers 56 are driven by means of a motor 46, on account of which the transport belts 58 are moved in order for the transport trucks 20 to be conveyed. Alternatively, the rollers 56 can also be connected in a friction-fitting manner to the transport belts 58.

FIG. 12 as an alternative shows a chain 58' as a transport means for conveying the transport trucks 20. The chain 58' is driven in a form-fitting manner by gear wheels 56'.

8. Eighth Exemplary Embodiment

Figure 13:
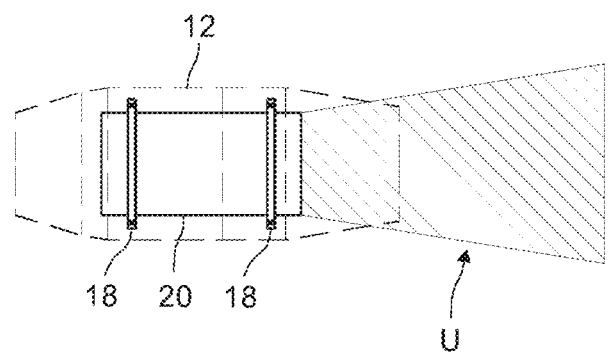
FIG. 13 shows a transport truck according to the invention having a monitoring region of the monitoring installation.
Figure 14:
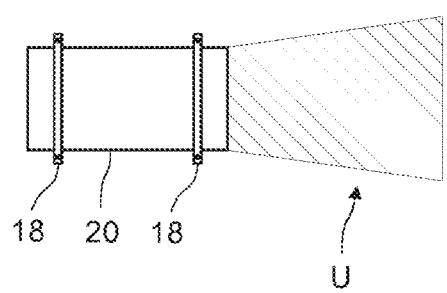
FIG. 14 shows the transport truck from FIG. 13, wherein the monitoring region is small in comparison to FIG. 13.

FIGS. 13 and 14 show the transport truck 20 shown in FIGS. 1 to 12 having fastening installations 18. The transport truck 20 in FIG. 13 is loaded with a vehicle body 12 and is situated outside the travel region 22.

FIG. 14 shows a transport truck 20 which is without a load and situated outside the travel region 22. By virtue of the additional risk on account of the vehicle body 12 when maneuvering the transport truck 20 in FIG. 13, the monitoring region U is set so as to be larger than the monitoring region U of the transport truck 20 without a load of FIG. 14.

Figure 15:
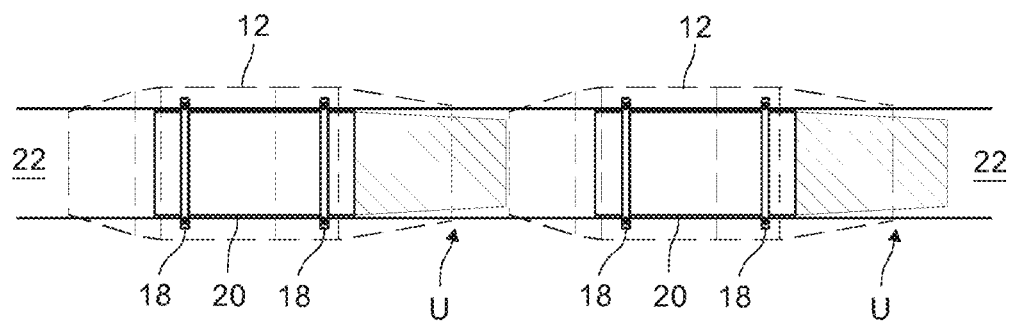
FIG. 15 shows the transport truck from FIG. 13 in a travel region.

FIG. 15 shows transport trucks 20 which are loaded with vehicle bodies 12 in the travel region 22. In comparison to the loaded transport truck of FIG. 13, the monitoring region is set so as to be smaller in order to be able to position the transport truck 20 more accurately in the travel region 22, without the monitoring installation 34 permanently generating error messages. On account thereof, smaller spacings between neighboring transport trucks 20 can be set in the travel region 22, this enabling a more efficient utilization in terms of space of the surface treatment facility 10. A smaller monitoring region U in the travel region 22 is less critical than outside the travel region 22, because the risk of colliding with people and objects is minor within the travel region 22.

The size of the monitoring region U can be made a function of the treatment process. For example, the monitoring region U in a coating facility, in which the vehicle bodies 12 are to be spaced apart in a comparatively wide manner may be larger than the monitoring region U in a drying facility.

What is claimed is:

1. A surface treatment facility for the surface treatment of vehicle bodies, the surface treatment facility comprising:
   a) at least two transport trucks that are floor-bound, each transport truck of the at least two transport trucks having a fastening installation to which vehicle bodies are able to be fastened, wherein each transport truck is able to be independently displaced by a dedicated drive that is able to be carried onboard each transport truck;
   b) a treatment chamber, which is delimited in a substantially gas-tight manner by a housing, and in which the surfaces of the vehicle bodies are treated, and in which at least part of the fastening installations and the vehicle bodies fastened thereto are able to be at least temporarily moved, respectively, by each transport truck in the treatment chamber;
   c) a travel region, which is disposed outside the housing, and in which each transport trucks is able to at least temporarily travel, wherein each transport truck is situated in the travel region when at least part of the respective fastening installation and the vehicle body fastened thereto is situated in the treatment chamber;
   d) a gap, which in the housing is configured between the travel region and the treatment chamber, and through which the fastening installation of each transport truck protrudes when each transport truck is situated in the travel region; and
   e) a monitoring installation, which is disposed on each transport truck and for checking a spacing of the at least two transport trucks from objects and/or people has a monitoring region, wherein a size of the monitoring region and/or a position of the monitoring region relative to each transport truck are/is variable,
   wherein
   a first atmosphere is able to be generated in the travel region, and a second atmosphere, which differs from the first atmosphere, is able to be generated in the treatment chamber, and
   the monitoring region is smaller when each transport truck is situated in the travel region.

2. The surface treatment facility as claimed in claim 1, wherein the first atmosphere differs from the second atmosphere on account of at least one parameter, and wherein the parameter is selected from the group comprising temperature, pressure, air humidity, flow rate, flow direction, and particle load.

3. The surface treatment facility as claimed in claim 1, further comprising an atmospheric separation installation, which impedes or prevents any exchange of atmospheres, at least from the treatment chamber to the travel region.

4. The surface treatment facility as claimed in claim 3, wherein the atmospheric separation installation is a sealing device, which is disposed in or on the gap.

5. The surface treatment facility as claimed in claim 3, wherein the atmospheric separation installation is a fan by means of which an air flow, which impedes or prevents any exchange of atmospheres, at least from the treatment chamber to the travel region, is generated.

6. The surface treatment facility as claimed in claim 5, wherein the air flow is an air curtain, which closes the gap in an at least almost air-tight manner.

7. The surface treatment facility as claimed in claim 1, wherein each transport truck in the travel region is able to be at least temporarily moved by a drive system, which is installed in the travel region and is independent of the dedicated drive that is able to be carried onboard each transport truck.

8. The surface treatment facility as claimed in claim 7, wherein the drive system at least in part of the travel region is connected in a form-fitting manner to each transport truck.

9. The surface treatment facility as claimed in claim 1, further comprising an adjustment device, which in the treatment space is specified for providing the fastening installation and the vehicle body fastened thereto at a variable height.

10. A manufacturing facility for producing vehicles, the manufacturing facility having the surface treatment facility as claimed in claim 1.

11. A method for the surface treatment of vehicle bodies, the method comprising:
   a) at least two transport trucks that are floor-bound, each transport truck of the at least two transport trucks having one fastening installation to which vehicle bodies are able to be fastened, wherein each transport truck is independently displaced by a dedicated drive that is able to be carried onboard each transport truck;
   b) at least part of the fastening installations and the vehicle bodies fastened to the fastening installations are at least temporarily moved, respectively, by each transport truck in a treatment chamber, which by a housing is delimited in a substantially air-tight manner, wherein the vehicle bodies are treated in the treatment chamber;
   c) the at least two transport trucks are at least temporarily moved to a travel region, which is disposed outside the housing, wherein each transport truck is situated in the travel region when at least part of the respective fastening installation and the vehicle body fastened thereto are situated in the treatment chamber; and
   d) the fastening installation of each transport truck protrudes through a gap, which in the housing is configured so as to be between the travel region and the treatment chamber when each transport truck is situated in the travel region, wherein a first atmosphere is generated in the travel region, and a second atmosphere, which differs from the first atmosphere, is generated in the treatment chamber, a monitoring installation is disposed in each transport truck and checks, by way of a monitoring region, a spacing of the at least two transport trucks from objects and/or people, a size of the monitoring region and/or a position of the monitoring region relative to each transport truck are/is variable, and the monitoring region is decreased when each transport track enters the travel region and/or is increased when each transport truck exits the travel region.

12. The method for treating surfaces of vehicle bodies as claimed in claim 11, wherein a spacing of the at least two transport trucks in succession in the travel region and/or a direction of movement of the at least two transport trucks is varied.

* * * * *